United States Patent [19]

Coqueret et al.

[11] Patent Number: 5,824,716
[45] Date of Patent: Oct. 20, 1998

[54] PHOTOCURABLE FILM-FORMING ACRYLIC LATICES

[75] Inventors: Xavier Coqueret, Phalempin; Pierre Rousseau, Dombasle-sur-Meurthe; Christophe Verge, Beaumontel, all of France

[73] Assignee: Elf Atochem S.A., France

[21] Appl. No.: 676,218

[22] PCT Filed: Dec. 29, 1994

[86] PCT No.: PCT/FR94/01553

§ 371 Date: Jul. 19, 1996

§ 102(e) Date: Jul. 19, 1996

[87] PCT Pub. No.: WO95/20016

PCT Pub. Date: Jul. 27, 1995

[30] Foreign Application Priority Data

Jan. 20, 1994 [FR] France ................................ 94 00599

[51] Int. Cl.⁶ ................ C08J 3/28; C08F 2/50; C08F 220/18
[52] U.S. Cl. ................ 522/31; 522/34; 522/39; 522/42; 522/50; 522/53; 522/46; 522/84; 522/85; 522/86; 522/153; 522/152; 522/150; 522/79; 523/160; 524/804; 524/815; 524/833; 524/831

[58] Field of Search .................... 522/84, 85, 86, 522/39, 53, 46, 42, 50, 34, 31, 150, 152, 153, 79; 524/804, 815, 831, 833; 523/160

[56] References Cited

U.S. PATENT DOCUMENTS

| 4,097,677 | 6/1978 | Emmons et al. ................. 522/181 |
| 4,144,212 | 3/1979 | Linder et al. . | |
| 4,948,819 | 8/1990 | Green et al. ................. 522/84 |
| 5,168,087 | 12/1992 | Li Bassi et al. ................. 522/85 |
| 5,230,984 | 7/1993 | Tachiki et al. ................. 522/153 |

FOREIGN PATENT DOCUMENTS 58-163937 9/1983 Japan .

OTHER PUBLICATIONS

Patent Abstracts of Japan, vol. 7, No. 290 (P–245), Sep. 1983.

*Primary Examiner*—Susan W. Berman
*Attorney, Agent, or Firm*—Bell, Boyd & Lloyd

[57] ABSTRACT

This invention relates to dicyclopentyl-oxyethyl methacrylate acrylic copolymer latices forming photocurable coalesced films and prepared by adding a photoinitiator to the latex, and which are useful for preparing lacquers and paints, particularly for building facades.

19 Claims, 7 Drawing Sheets

[KEY TO dL VALUES: 1) −5  2) −4.5  3) −4]

[KEY TO dL VALUES: 1) −5  2) −4  3) −3  4) −2  5) −1]

[KEY TO dL VALUES: 1) −5  2) −4  3) −3  4) −2  5) −1]

[KEY TO dL VALUES: 1) −4  2) −3  3) −2  4) −1]

5,824,716

PHOTOCURABLE FILM-FORMING ACRYLIC LATICES

TECHNICAL FIELD

The invention relates to acrylic latices which are capable of forming photocrosslinkable films.

Traditional latex paints readily employ aqueous emulsions of acrylic polymers or copolymers which, by progressive drying, form a coalesced film. When they are applied in building, especially in exterior applications, these paints are expected to show rapid dust-free drying and then curing, affecting essentially the surface, while it is appreciated that the underlying layers retain a certain flexibility in order to accommodate any imperfections of the substrate (microfissures in a wall, for example), and if appropriate to exhibit good resistance to soiling.

BACKGROUND OF THE INVENTION

Prior Art

The interest of specialists has turned towards latices obtained from the emulsion copolymerization of $\alpha,\beta$-unsaturated monomers which are preferably chosen such that the copolymer formed has a glass transition temperature Tg which should be lower than the temperature of use in order that a polymer film may form by coalescence at this temperature. The material of the films thus formed is a thermoplastic substance, and it is obviously highly advantageous to be able to implement its post-curing by crosslinking after coalescence. This post-crosslinking can, moreover, also affect the properties of the copolymer by crosslinking of the polymer chains as well as participating in the cohesion of the film by crosslinking between the particles of latex deposited. Various modes of crosslinking are possible. It seemed appropriate to make use of photocrosslinking, especially since the coatings at issue in this case are exterior coatings and are therefore subject to natural UV irradiation. This photocrosslinking, which is a mechanism of photopolymerization, consists in causing luminous or electromagnetic radiation to act in order to induce the polymerization of functional monomers, oligomers or polymers. The energy absorbed by the system is used to create new bonds between the molecules. Photocrosslinking can be initiated by using photoinitiators, crosslinking agents and polymers which are intrinsically photocrosslinkable. In formulations which are already complex, such as those of paints, the latter solution is adopted for reasons of convenience. Since the latices which it is proposed to improve are latices of acrylic type, the choice is made to incorporate other monomers in the chain which carry a methacrylate function and which also possess a reactive function which will permit the formation of bridges when the coalesced latex film is irradiated, as is already known from the prior art: dicyclopentenyloxyethyl acrylate, and preferably dicyclopentenyloxyethyl methacrylate or DCPOEMA (FIG. 1).

DCPOEMA possesses two double bonds having a priori different reactivities. One of them is acrylic, and behaves in practice like that of traditional acrylic monomers. The other is cyclic and is known to be markedly less reactive but capable of giving rise to post-crosslinking by virtue of appropriate treatment.

DCPOEMA has been used as an additive in latices for coatings as a reactive coalescence agent (U.S. Pat. No. 4,097,677), as a plasticizer of the latex particles, as an agent for lowering the minimum film-forming temperature and as a siccative in the presence of metal salts. It therefore takes part in the formation of films of high hardness. It is also mentioned in the European publication EP 20125, where it is employed as optional comonomer in latices obtained by emulsion polymerization, in combination with isobornyl (meth)acrylate in promoting adhesion to polypropylene, where it acts as a crosslinking agent by autoxidation. Similar products, dicyclopentenyl acrylate and methacrylate (DCPA and DCPMA), also appear in U.S. Pat. No. 4,144,212 as functional comonomer in latices, leading to coatings which can be dried in the presence of metal salts and which also have good solvent resistance. Finally, DCPOEMA appeared recently (EP 478193) as a comonomer which can be used in core-shell latices which are resistant to bases, where it is used as an anchorage site between the core and the shell of the particles.

DESCRIPTION OF THE INVENTION

It has now recently been found that it was possible to impart to latex films of DCPOEMA copolymers the property of being photocrosslinkable, by adding photoinitiators to the latex as obtained by emulsion polymerization. This is a very simple operation of unexpected effectiveness, since on the one hand the photoinitiator is introduced into the heterogeneous medium on the microscopic scale, as formed by the latex, and also since the photoinitiator is introduced within the aqueous continuous phase, which specifically is intended to be removed from the beginning of the drying process which forms the film to be crosslinked.

The present invention therefore consists in latex compositions of copolymers of $\alpha,\beta$-unsaturated compounds and dicyclopentenyloxyethyl methacrylate (DCPOEMA) containing a photoinitiator. In these compositions, the content of DCPOEMA can be as high as 50% (expressed relative to all of the copolymers); however, on the other hand, crosslinking is highly sensitive to the content of DCPOEMA, which may still be effective, under the conditions of the invention, at levels as low as 0.01%.

Photoinitiators are commonly subdivided into those which can be dissolved in water and those which can be dissolved in organic solvents. These products are known to the person skilled in the art. Photoinitiators which can be used for the invention are those which operate in the ultraviolet range, since they are intended to bring about the crosslinking of the DCPOEMA copolymer films under natural light or under industrial radiation sources which operate in this wavelength range. They are used for the invention in quantities by weight, relative to the wet latex, of between 0.01 and 5%.

Figure 1:
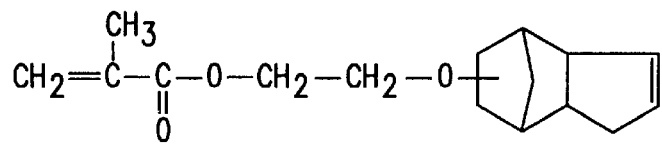
FIG. 1 shows the structural formula of DCPOEMA.
Figure 2:
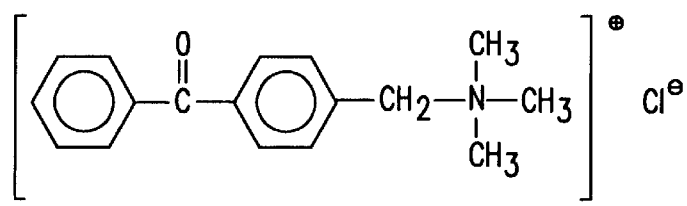
FIGS. 2 to 9 show structural formulas of photoinitiators suitable for use in the instant invention.
Figure 3:
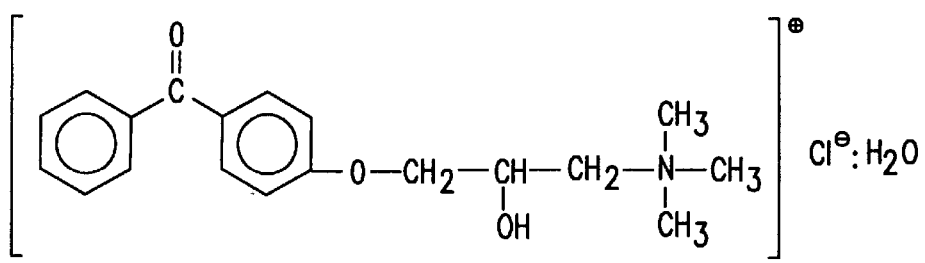
Figure 4:
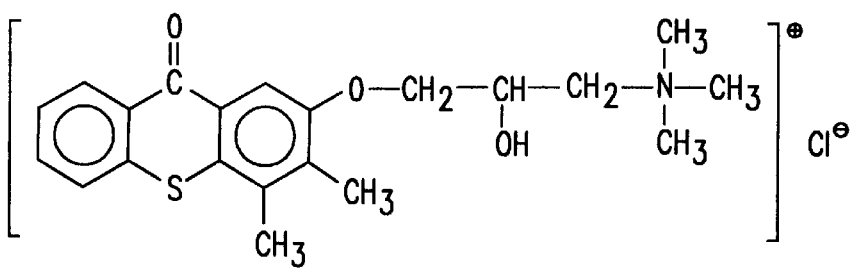
Figure 5:
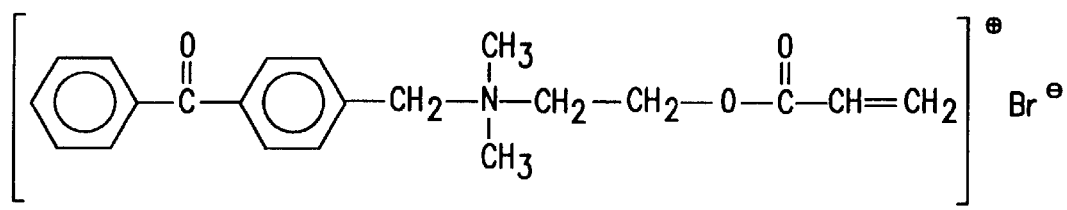

As far as water-soluble photoinitiators which can be used for the invention are concerned, mention may be made of the quaternary ammonium derivatives of benzophenone or of thioxanthone, such as: (4-benzoylbenzyl) trimethylammonium chloride (FIG. 2) or CANTACURE BTC from Octel Chemicals Limited; 2-hydroxy-3-(4-benzoylphenoxy) -N,N,N-trimethyl-1-propanaminium chloride monohydrate (FIG. 3) or CANTACURE BPQ from Octel Chem., which is notable in that its absorption band is shifted more towards the visible range, making it highly attractive for pigmented formulations; 2-hydroxy-3-(3,4-dimethyl-9-oxo-9H-thioxanthen-2-yloxy)-N,N,N-trimethylpropanaminium chloride (FIG. 4) or CANTACURE QTX from Octel Chem., whose absorption maximum is shifted to 400 nm. It can be used in low quantities, which reduces its principal disadvantage of imparting a yellow color to formulations in which it is present; (2-acryloyloxyethyl) (4-benzoylbenzyl)dimethylammonium bromide (FIG. 5) or ABQ from Octel Chem., whose terminal vinyl group enables copolymerization with the other constituents of the copolymer, resulting in the advantage of a very low salting-out rate after crosslinking, and which, if appropriate, could even be introduced directly during the synthesis of the latex.

These quaternary derivatives are powders which are employed after having been dissolved in a minimum amount of distilled water before being incorporated in the latex.

Figure 6:
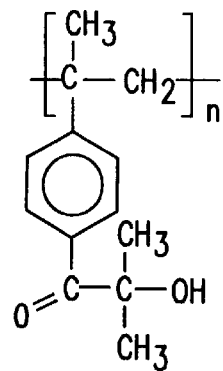
Figure 7:
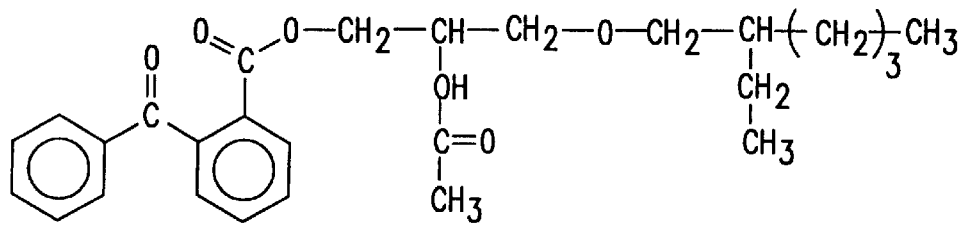
Figure 8:
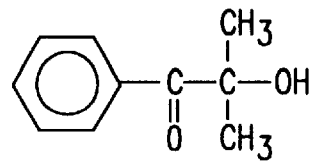
Figure 9:
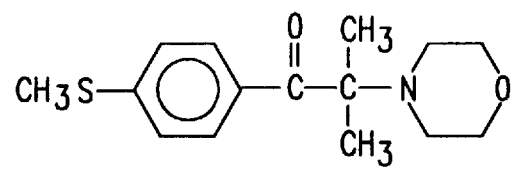

Photoinitiators which are soluble in organic solvents and which operate within the ultraviolet wavelength range include, conventionally, benzophenone and thioxanthone. However, their crystalline state at room temperature and their hydrophobicity make them of little practical use for latices. In this regard, preference over them is given to functionalized benzophenones such as 1-(2-ethylhexyloxy) -2-(acetoxy)-3-(2-benzoylbenzoyloxy)propane (FIG. 7), which is synthesized in accordance with the thesis by L. Pouliquen (Lille 1991) and is dubbed EHGE-BBA, which has the advantage of being liquid at room temperature. Also recommended are derivatives of the substituted phenylpropanone type: 2-hydroxy-2-methyl-1-phenylpropan-1-one (FIG. 8) marketed by Merck under the trade name DAROCUR 1173. This is a water-immiscible liquid which is nevertheless soluble in the majority of organic solvents and can be introduced into the latex with stirring. It has the advantage of not causing yellowing of the coatings. It loses part of its effectiveness on excessively prolonged exposure to ultraviolet radiation; drying of the films under too violent a stream of hot air may have the same consequences. The recommended quantity in the formulations varies between 0.5 and 5%. One of its derivatives has proved very interesting: the oligomer of 2-hydroxy-2-methyl-1-[(4-isopropenyl)phenyl]propan-1-one (FIG. 6). Like other initiators which carry hydroxyacetophenone groups (in this case these groups are pendant along the oligomer chain), it has the advantage of causing only a very slight yellowing of the coatings. It is marketed in the form of an emulsion under the name ESAKURE KIP Water Emulsion by Fratelli Lamberti. 2-Methyl-1-[4-(methylthio)phenyl]-2-morpholinopropan-1-one (FIG. 9), marketed by Merck under the trade name IRGACURE 907. It has the feature of having a high molar extinction coefficient, making it suitable for absorbing the incident radiation and thus for use in the formulation of $TiO_2$-filled paints. It is used after having been dissolved in the minimum amount of butyldiglycol acetate.

Figure 10:
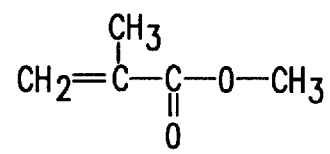
FIG. 10 shows methyl methacrylate.
Figure 11:
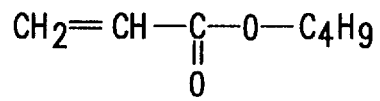
FIG. 11 shows butyl acrylate.

The latices of the invention are copolymer suspensions which are obtained by emulsion copolymerization of mixtures of $\alpha,\beta$-unsaturated comonomers, for which there is no purpose in repeating a list which can be found in all of the appropriate works (for example Polymer Handbook, 3rd Edition, Wiley Interscience) and of DCPOEMA. The examples given below mention, in a highly familiar and nonlimiting manner, methyl methacrylate (MMA; FIG. 10) and butyl acrylate (BuA; FIG. 11), which make up a pairing readily enabling the glass transition temperature Tg of the final polymer to be set at values of between −50° C. and +100° C. It is recalled that the glass transition temperature of a copolymer can be predicted by application of Fox's law $$\frac{1}{Tg} = \sum_{i=1}^{n} \frac{X_i}{Tg_i}$$

in which the values $Tg_i$ are the glass temperature coefficients of the comonomers, expressed in K, and in which the values $x_i$ are their mass fractions. MMA has a Tg of +105° C., BuA a Tg of −54° C. and DCPOEMA a Tg of −20° C.

The photosensitivity of the films obtained from the latices according to the invention is determined with the aid of the so-called negative photoresist test, a conventional test which is used for the appraisal of resins for microlithography.

The photosensitive polymer film is exposed under a mono- or polychromatic light source via a mask system. The part of the film thus irradiated in a specific wavelength range crosslinks and becomes insoluble. The nonirradiated part retains its solubility. It is therefore removed by simple washing with a solvent such as acetone. The remaining part, stuck to the support, can if appropriate be stained by a dye.

The tests are carried out in three stages.

a) Deposition of the film on a polyester sheet. The film is deposited with the aid of a calibrated Braive spiral straight-edge applicator with a thickness of 25 $\mu$m on a polyester sheet with a surface area of 16×18 cm$^2$ and a thickness of 75 $\mu$m. This support is fastened to a horizontal bench. The liquid photosensitive formulation is deposited lengthwise in front of the film drawer and then is spread rapidly over the entire surface of the support in order to obtain, after evaporation of the water, a film with a thickness which is as regular as possible. After evaporation of the water during the phase of coalescence of the latex films, the thickness obtained is from 12 to 14 $\mu$m (the latices synthesized contain approximately 50% water).

b) Exposure. The support of the film is cut in accordance with the dimensions of the slide frame. The mask consists of circular holes and for each operation permits the exposure of identical surfaces over different periods. The exposures are carried out at the same power throughout the exposure period in free air and at ambient temperature (approximately 18° C.). In the examples, a 900 watt HANOVIA L 5 430 000 xenon lamp was used under 40 amperes, which develops a power of 14 mW/cm$^2$ at 254 nm and 82 mW/cm$^2$ at 365 nm.

c) Development. The nonirradiated film is removed very easily from the support using acetone. The sufficiently irradiated parts of the film remain stuck to the support and are visible to the naked eye.

Determination of the Photosensitivity S.

The effective photosensitivity S of a photocrosslinkable polymer is defined as being inversely proportional to the minimum luminous energy which leads to complete crosslinking of a film of this polymer:

$$S = \frac{1}{E} = \frac{1}{It}$$

where E is the minimum energy necessary for complete insolubilization of 1 cm² of polymer, I is the energetic illumination received by the polymer film, in watts/cm², and t is the time required for complete crosslinking of the irradiated part (in seconds). The insolubilization term is determined visually by examining the irradiated pellet. It is reasonable to accord a margin of error of from 5 to 10% to the times indicated.

Paints

The paints intended are of the type of paints for building facades, and on principle are reduced in certain of their components which are unfavorable to dirtying, so as to make the control tests more significant. These paints contain in principle the following ingredients:

(1) Cellulosic thickener. Increases viscosity in basic medium.

(2) Polyphosphate dispersant. "Wetting agent". Stabilizes hydrophobic particles in suspension in water.

(3) Bactericide, fungicide.

(4) Acrylic dispersant. Exerts stabilizing effect by wetting the particles.

(5) Alcalifying agent (in relation with (1)°).

(6) Antifoam. Suppression of bubbles. Preventive or curative.

(7) $TiO_2$ of rutile type. Provides opacity and whiteness. Very fine particles (mean diameter $F_m<1$ μm). Filler.

(8) Particles of calcium carbonate $CaCO_3$. Mean diameter $F_m=5$ μm. Filler.

(9) Particles of calcium carbonate $CaCO_3$. Mean diameter $F_m=10$ μm. Filler. The use of titanium oxide $TiO_2$, by virtue of its very fine particles ($F_m$1 μm), leads to the production of gloss paints. The $CaCO_3$ fillers of from 5 to 10 μm make it possible to make satin or matt paints. By combination of the three types of pulverulent substances, (7), (8) and (9), ideal fillers are realized which contain few voids and whose particles roll well over one another.

(10) Latex. Binder; its coalescence leads to the formation of the paint film.

(11) Coalescence agent. Can be used to reduce an excessive Tg. Generally, butyldiglycol (BDG) or butyldiglycol acetate (BDGA).

(12) Polyurethane thickener. Regulates the final paint viscosity and the elasticity and tension of the film.

(13) "Viscosity" water. Fine adjustment of the final viscosity.

The manner in which the paint is produced is simple. Work in a stainless steel beaker and a disperser fitted with an appropriate blade (e.g.: 500 ml beaker+blade no. 55, or 1000 ml beaker+blade no. 70). The sequence of incorporation is very important. Add (1) to the water, with stirring. Allow to swell for 3 minutes. Add (2), (3), (4), (5) and (6). Separately, mix (7), (8) and (9). Add these pulverulent substances to the mixture with stirring. Cool in a bath of cold water. Leave with stirring for 20 minutes at 2000 rpm. The paste is then obtained. Add (10), (11), (12) and (13). Mix for 5 minutes. The paint is ready.

Test for Soiling Resistance.

This test is intended to assess the surface crosslinking of the paints, i.e. of relatively thick, pigmented films which after irradiation will have a hardened surface and a flexible core. The principle of this test is simple. After application of a paint film to a support, a standardized drying operation is carried out. The plates are then irradiated by several processes. The coatings are subsequently soiled artificially with the aid of a pigmented paste which has an aqueous basis (slurry) but contains no binder. After a fixed drying time, the plates are cleaned under a stream of clear water. The slurry is removed very easily owing to the absence of binder. The coatings are then slightly coloured to a greater or lesser extent. Owing to the choice of the colored pigments making up the slurry, the residual coloration is representative of natural soiling. The difference in the colorations before and after application of the slurry is measured with the aid of a spectrocolorimeter.

The test as carried out herein comprises the following steps:

1) Application of the paints (200 μm on the smooth bar coater with the aid of an automatic applicator) on stainless-steel plates which have been degreased beforehand with MEK (methyl ethyl ketone). In order to verify the reproducibility of the tests, 3 tests are carried out on each formulation.

2) Drying (for one week) under standard conditions (23° C., relative humidity RH of from 50% to 75%).

3) Measurement of the CIE values on a spectrocolorimeter: luminance L, red index a and yellow index b. The spectrocolorimeter used is of the Hunterlab brand. The light source used is D 65 (daylight) at 10°. The white standard carries the reference SN 65 240 with the following absolute values: L=92.99, a=−1.11 and b=−0.72.

4) Photochemical treatment: either natural sunlight on the outdoor exposure rack or QUV (a simulated ageing apparatus "QUICK UV"0 from Q-Panel Co.): cycles of 4 hours of UV at 313 nm followed by 4 hours of humidity.

5) Drying in ambient air for one hour.

6) Application by brush of a slurry composed of a mixture of black, yellow and red iron oxides.

7) Drying in ambient air (for 3 hours).

8) Oven-drying at 60° C. for 1 hour.

9) Washing of the plates with water, while rubbing with a soft paper until the paper remains clean.

10) Measurements with the spectrocolorimeter of the CIE values L, a and b before and after application of the slurry. Calculations of the differences dL, da and db.

MODES OF IMPLEMENTING THE INVENTION:

EXAMPLE 1 (Latex Synthesis)

The composition of the various synthesized latices and the distribution of the various constituents are as follows:

| Stock solution | |
|---|---|
| Demineralized water | 45.5 parts |
| REWOPOL (WITCO) NOS 25 (35%) | 0.7 part |
| (nonylphenol polyglycol ether sulphate) | |
| REWOPAL (WITCO) HV 25 (80%) | 0.6 part |
| (nonylphenol polyglycol ether) | |
| Metabisulphite solution | |
| Demineralized water | 2.0 parts |
| Sodium metabisulphite | 0.3 part |
| Preemulsion | |
| Demineralized water | 41.7 parts |
| REWOPOL NOS 25 (35%) | 6.4 parts |

-continued

| | |
|---|---|
| REWOPOL HV 25 (80%) | 0.6 part |
| Monomers | 100.0 parts |
| Initiator | |
| Demineralized water | 6.0 parts |
| Ammonium persulphate | 0.3 part |

The various copolymers synthesized were obtained from the monomer mixtures given below. As a counter-example, a latex was produced in which the DCPOEMA was replaced by its hydrogenated homologue, and which therefore no longer had the cyclic double bond. The hydrogenated DCPOEMA has been symbolized by DCPOEMA h. (AA= acrylic acid; NMA=N-methylolacrylamide)

| Latex | A | B | C | D | E | F | G |
|---|---|---|---|---|---|---|---|
| MMA | 25.5 | 26.5 | 25.5 | 23.0 | 20.5 | 14.0 | 25.5 |
| BuA | 72.5 | 70.5 | 70.5 | 70.0 | 67.5 | 64.0 | 72.5 |
| AA | 1.0 | 1.0 | 1.0 | 1.0 | 1.0 | 1.0 | 1.0 |
| NMA | 1.0 | 1.0 | 1.0 | 1.0 | 1.0 | 1.0 | 1.0 |
| DCPOEMA | — | 1.0 | 2.0 | 5.0 | 10.0 | 20.0 | — |
| DCPOEMA h | — | — | — | — | — | — | 5.0 |

The procedure used for these various syntheses is as follows:

Charge the stock solution to the reactor and start heating to reach 67° C., while preparing the preemulsion, the sodium metabisulphite solution and the initiator solution.

Introduce the metabisulphite solution into the reactor.

Separately and simultaneously, run in the preemulsion and the initiator solution over 4 hours 30 minutes while maintaining the reaction temperature at 67° C.

After the feeds have been run in, allow reaction to continue for one hour more at 67° C.

Cool the reaction mixture and adjust the pH to 8.5 using 28% ammonia solution.

The main characteristics of the synthesized latices are as follows:

| Latex | A | B | C | D | E | F | G |
|---|---|---|---|---|---|---|---|
| Solids content (%) | 50.5 | 50.0 | 49.7 | 49.8 | 50.5 | 50.9 | 48.5 |
| pH | 8.5 | 8.5 | 8.5 | 8.5 | 8.5 | 8.5 | 8.5 |
| Diameter (nm) | 175 | 140 | 135 | 140 | 125 | 130 | 170 |
| Tg (°C.) | -13.7 | -13.9 | -12.9 | -14.1 | -10.5 | -9.5 | -17 |
| Residual monomers (ppm) | <100 | <100 | <100 | <100 | <100 | 1000 | 6000 |

In the absence of photoinitiators, these latices show no photosensitive character.

EXAMPLE 2

In this example, the effectiveness of a number of water-soluble photoinitiators, or photoinitiators soluble in organic solvents, which were added in variable amount to the latex D, was verified on a formulation of the varnish type based on the latex D. The tests used are negative photoresist tests. The wet latex films have a thickness of 25 μm. During the coalescence phase, the water evaporates, and, since it makes up about 50% by mass of the dispersion, the thickness of the film after coalescence is approximately half of that before coalescence. Precise measurements made it possible to determine a mean thickness of from 12 to 14 μm. The degree of crosslinking is evaluated by a test of the solubility in acetone of the irradiated zone under a 900 watt HANOVIA lamp.

The effectiveness of the various photoinitiators is shown in the following table by way of the minimum time, expressed in seconds, for obtaining an irradiated zone which is completely insoluble in acetone and is therefore completely crosslinked.

| 1/2 | Darocur 1173 | Irgacure 907 | Esakure | BTC | ABQ | QTX | EHGE-BBA |
|---|---|---|---|---|---|---|---|
| 0 | 4 | 4 | 4 | 4 | 4 | 4 | 4 |
| 0.02 | — | 3 | — | — | — | — | — |
| 0.05 | 4 | 2.5 | — | — | — | — | — |
| 0.01 | 4 | 2.5 | 4.5 | — | — | — | 2.5 |
| 0.2 | 3 | 3.5 | 5.5 | — | — | — | — |
| 0.25 | — | — | — | — | 2.5 | 4 | 2.5 |
| 0.4 | — | — | — | — | — | — | 2.25 |
| 0.5 | 4 | 5 | 6 | 2.5 | 2 | 2.5 | — |
| 0.75 | — | — | 6 | 1.5 | 2 | 2 | 2.75 |
| 1 | 5 | 9 | 6 | 1.25 | 3 | 1.5 | — |
| 1.25 | — | — | — | 1 | — | — | — |
| 1.5 | — | — | — | 1.25 | 3 | — | 4.5 |
| 2 | 8 | 16 | 6 | 2.5 | — | 10 | 4.5 |
| 2.5 | — | — | 10 | — | — | — | — |
| 3 | — | — | 16 | — | — | — | — |
| 4 | 18 | — | 18 | 4 | — | 100 | — |

The percentages indicated are percentages by mass based on wet latices (in order to obtain the proportions of photoinitiator in the coalesced films, multiply these values by 2).

It is observed that, for each photoinitiator tested, there is an optimum percentage which leads to the shortest crosslinking time. This optimum proportion has been expressed in numbers of moles of photoinitiator per mole of DCPOEMA.

| | BTC | QTX | ABQ | EHGE-BBA | Irgacure 907 | Darocur 1173 | Esakure Emulsion |
|---|---|---|---|---|---|---|---|
| Optimum % | 1.25 | 1 | 0.75 | 0.4 | 0.1 | 0.2 | 0.1 |
| min. t (seconds) | 1 | 1.5 | 2 | 2.25 | 2.5 | 3 | 5 |
| n gen. rad. | 0.45 | 0.22 | 0.17 | 0.09 | 0.04 | 0.09 | 0.02 |

Figure 12:
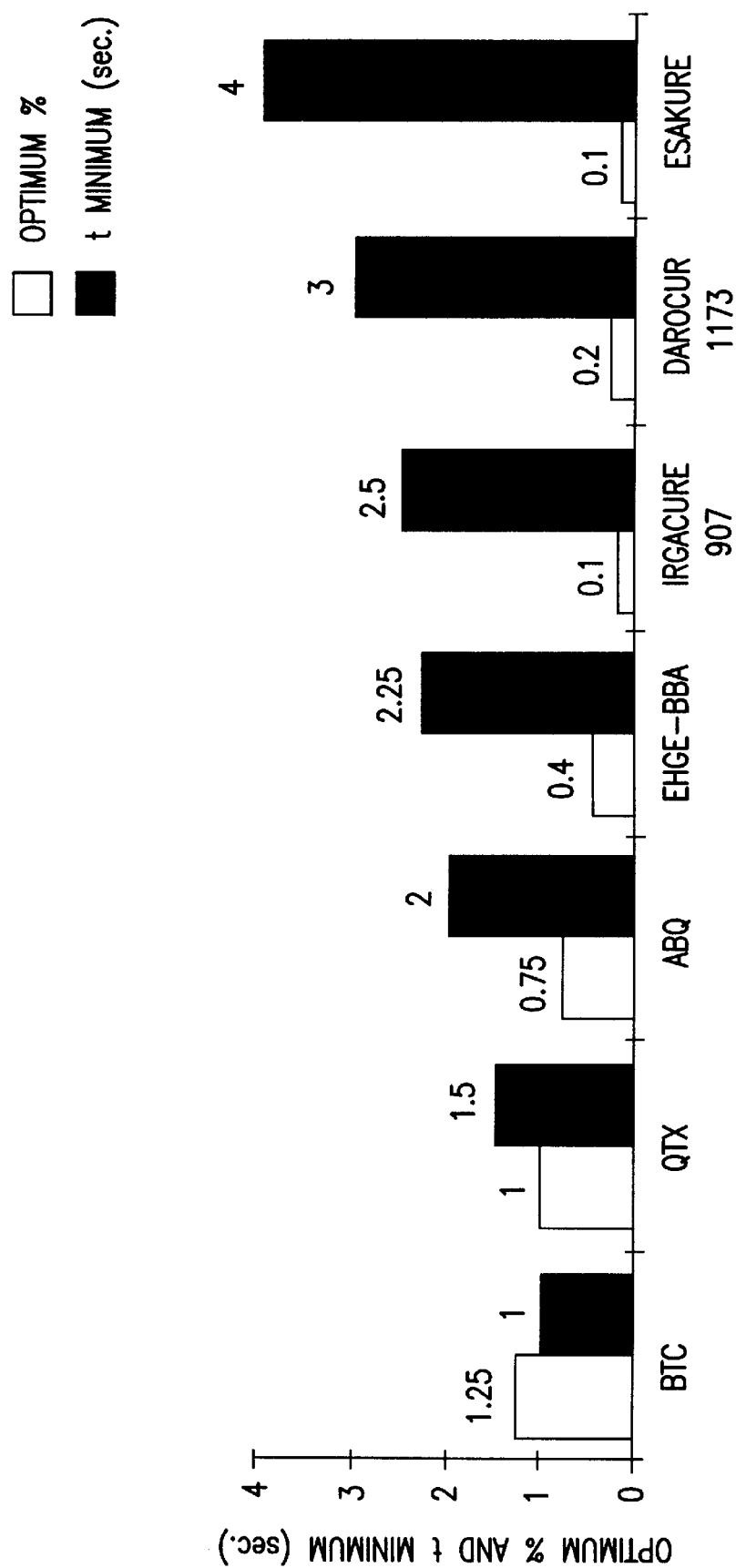
FIG. 12 shows bar graphs of crosslinking times of various coatings.

These results were transcribed to FIG. 12, which shows the time required to obtain proper crosslinking of the coating. The shorter this time, the better the performance of the corresponding photoinitiator. On the other hand, it is desirable for the concentration of photoinitiator to be as low as possible, if only for economic reasons or reasons of toxicity. It is evident that this choice remains entirely open to the person skilled in the art.

EXAMPLE 3

This example again relates to a varnish application. The advantage of the DCPOEMA was verified with the aid of the latex A (without DCPOEMA), which was admixed with CANTACURE BTC and compared with the tests carried out previously.

The negative photoresist tests were carried out under exactly the same conditions as the photochemical tests carried out previously on the latex D. The results are shown in the following table.

| % BTC | t (sec.) |
|---|---|
| 0 | 12 |
| 0.58 | 6 |
| 0.93 | 5 |
| 2.08 | 6 |
| 4.05 | 14 |

The effectiveness of the system appears markedly less by a factor of approximately 5.

EXAMPLE 4

The advantage of the DCPOEMA was verified with the aid of the latex G (DCPOEMA h) which was admixed with CANTACURE BTC and compared with the tests carried out previously, according to the same negative photoresist tests. The results are shown in the table below.

| % BTC | t (sec.) |
|---|---|
| 0 | 8 |
| 0.53 | 6 |
| 0.99 | 7 |
| 1.99 | 8 |
| 4.04 | 16 |

The effectiveness of the system appears markedly less by a factor of approximately 6.

EXAMPLE 5 (Paint Application)

This example relates to an evaluation, carried out on a paint formulation, of the effectiveness of crosslinking by examination of the difference in luminance after application of a slurry and cleaning. The paint formula used is as follows:

| Constituent | Supplier | Mass (in g) |
|---|---|---|
| Water | — | 60.9 |
| (1) NATROSOL 250 MR | AQUALON | 0.9 |
| (2) CALGON N | HOECHST | 0.54 |
| (3) PROXSAN TB 801 | PROTEX | 0.9 |
| (4) COATEX P 90 | COATEX | 1.8 |
| (5) AMMONIA SOLUTION 22% | | 1.8 |
| (6) NOPCO 8034 | HENKEL | 1.8 |
| (7) TiO$_2$ TR 92 | TIOXIDE | 134.94 |
| (8) DURCAL 5 | OMYA | 58.47 |
| (9) DURCAL 10 | OMYA | 197.91 |
| (10) Latex | | 482.46 |
| (11) BDG | | 4.5 |
| (12) NOPCO DSX 1514 | HENKEL | 2.16 |
| (13) Water | | 50.92 |
| Total | | 1000 |

Three series of tests were carried out in the form of an experimental plan, controlling the percentages of DCPOEMA, of photoinitiator and of dimethylethanolamine (DMEA) in the formulated paint, the purpose of the control of the latter parameter being to examine the contribution of an amine to the formula, as is conventional in traditional photocrosslinkable system compositions. The test series are summarized below.

| | DCPOEMA in the latex | Photo-initiator | DMEA | Type of treatment |
|---|---|---|---|---|
| Series 1 | 1% to 5% | BPQ 0.5% to 4% | 1% to 4% | QUV 4 h + hum. 4 h |
| Series 2 | 1% to 5% | BPQ 0% to 5% | 0% to 5% | Sun for one day |
| Series 3 | 1% to 5% | QTX 0% to 5% | 0% to 5% | Sun for one day |

Seven triplets of values were retained for each parameter investigated, for the following parameters: % of DCPOEMA in the latex, % of photoinitiator and % of DMEA in the final paint; three additional triplets making it possible to verify the validity of the test.

Figure 13:
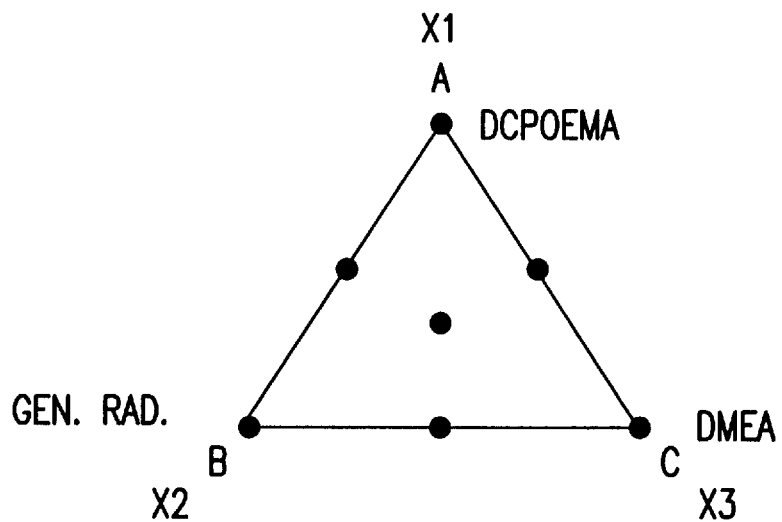
FIG. 13 shows a ternary diagram of the test of Example 5.

These seven triplets are located on a ternary diagram as shown in FIG. 13, where the parametric values X1, X2 and X3 can adopt any value from 0 to 1, but with the following restriction: X1+X2+X3=1. These 3 parameters adopt very precise values in the case of the 7 experiments to be carried out. Triplets 8 to 10 make it possible to emphasize the results.

| Response of test (L, a, b) | X1 | X2 | X3 |
|---|---|---|---|
| Y1 | 1 | 0 | 0 |
| Y2 | 0 | 1 | 0 |
| Y3 | 0 | 0 | 1 |
| Y4 | ½ | ½ | 0 |
| Y5 | ½ | 0 | ½ |
| Y6 | 0 | ½ | ½ |
| Y7 | ⅓ | ⅓ | ⅓ |
| Y8 | ⅔ | ⅙ | ⅙ |
| Y9 | ⅙ | ⅔ | ⅙ |
| Y10 | ⅙ | ⅙ | 2/3 |

Series 1: Photoinitiator=BPQ. Type of treatment: QUV (4 h of UV at 313 nm and 4 h of humidity).

| Response | % DCPOEMA | % BPQ | % DMEA | L after | dL |
|---|---|---|---|---|---|
| Y1 | 5 | 0.5 | 1 | 89.78 | -3.17 |
| Y2 | 1 | 4 | 1 | 90.95 | -1.97 |
| Y3 | 1 | 0.5 | 4 | 87.82 | -5.10 |
| Y4 | 3 | 2.25 | 1 | 88.69 | -4.29 |
| Y5 | 3 | 0.5 | 2.5 | 88.72 | -4.15 |
| Y6 | 1 | 2.25 | 2.5 | 89.77 | -3.23 |
| Y7 | 2.33 | 1.67 | 2 | 89.21 | -3.69 |
| Y8 | 3.67 | 1.08 | 1.5 | 90.83 | -1.97 |
| Y9 | 1.67 | 2.83 | 1.5 | 90.25 | -2.74 |
| Y10 | 1.67 | 1.08 | 3 | 88.32 | -4.67 |

Series 2: Photoinitiator=BPQ, type of treatment: sun for one day.

| Response | % DCPOEMA | % BPQ | % DMEA | L after | dL |
|---|---|---|---|---|---|
| Y1 | 5 | 0 | 0 | 91.78 | -2.66 |
| Y2 | 1 | 5 | 0 | 92.42 | -1.47 |
| Y3 | 1 | 0 | 5 | 85.50 | -9.40 |
| Y4 | 3 | 2.5 | 0 | 93.23 | -1.19 |
| Y5 | 3 | 0 | 2.5 | 90.96 | -3.11 |
| Y6 | 1 | 2.5 | 2.5 | 91.31 | -2.65 |
| Y7 | 2.33 | 1.67 | 1.67 | 91.91 | -2.18 |
| Y8 | 3.67 | 0.83 | 0.83 | 92.02 | -1.64 |

-continued

| Response | % DCPOEMA | % BPQ | % DMEA | L after | dL |
|---|---|---|---|---|---|
| Y9 | 1.67 | 3.33 | 0.83 | 93.04 | −1.56 |
| Y10 | 1.67 | 0.83 | 3.33 | 90.56 | −2.22 |

Series 3: Photoinitiator=QTX. Type of treatment: sun for one day.

| Response | % DCPOEMA | % BPQ | % DMEA | L after | dL |
|---|---|---|---|---|---|
| Y1 | 5 | 0 | 0 | 94.39 | −1.80 |
| Y2 | 1 | 5 | 0 | 85.18 | −5.54 |
| Y3 | 1 | 0 | 5 | 90.94 | −2.33 |
| Y4 | 3 | 2.5 | 0 | 89.95 | −3.16 |
| Y5 | 3 | 0 | 2.5 | 89.74 | −4.08 |
| Y6 | 1 | 2.5 | 2.5 | 86.99 | −5.90 |
| Y7 | 2.33 | 1.67 | 1.67 | 87.43 | −5.23 |
| Y8 | 3.67 | 0.83 | 0.83 | 90.16 | −3.21 |
| Y9 | 1.67 | 3.33 | 0.83 | 87.57 | −5.38 |
| Y10 | 1.67 | 0.83 | 3.33 | 87.52 | −4.84 |

Two formulations are noted whose luminance after soiling is greater than all of the other paints

| % DCPOEMA in the latex | % by mass BPQ | % by mass DMEA | L |
|---|---|---|---|
| 3% | 2.5% | 0% | 93.23 |
| 1.7% | 3.3% | 0.8% | 93.04 | which make it possible to conclude that the absence of free amine does not prejudice the surface photocrosslinking performance and that it is of no value to use excessively high proportions of DCPOEMA.

EXAMPLE 6 (Paint Application)

The new paint formulation is indicated below

| Constituent | Supplier | Mass (in g) |
|---|---|---|
| Water | — | 142.00 |
| (1) NATROSOL 250 HBR | AQUALON | 0.50 |
| or | or | or |
| VISCOATEX 46 | COATEX | 1.60 |
| (2) CALGON N | HOECHST | 0.55 |
| (4) COATEX P 90 | COATEX | 1.90 |
| (5) NH$_3$ | PROLABO | 1.70 |
| (7) TiO$_2$ TR 92 | TIOXIDE | 129.10 |
| (8) DURCAL 5 | OMYA | 56.00 |
| (9) DURCAL 10 | OMYA | 189.40 |
| (10) Latex | | 470.00 |
| (11) BDGA | BP CHEMICALS | 4.55 |
| (6) DENYDRAN 1620 | SIDOBRE SINNO | 1.50 |
| (12) SER AD FX 1010 | SERVO DELDEN | 1.30 |

The latices used which are retained here are latices A, B and C, containing respectively 0, 1 and 2% of DCPOEMA, and they are used to formulate paints with different percentages of ABQ as photoinitiator. Before being added, ABQ is dissolved in the minimum amount of distilled water (3.1 g of ABQ and 2.5 g of water). In order to make it possible to change the formulation of the paint without giving rise to adaptation problems (variation in the solids content in particular), the amounts of ABQ are expressed as percentages by mass of ABQ relative to the wet latex rather than to the final paint.

Figure 14:
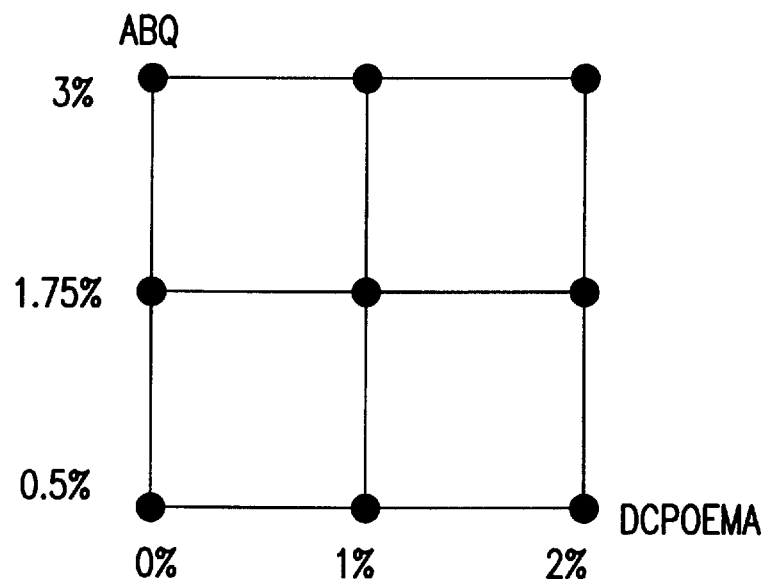
FIG. 14 shows a diagram of results of the test of Example 6.
Figure 15:
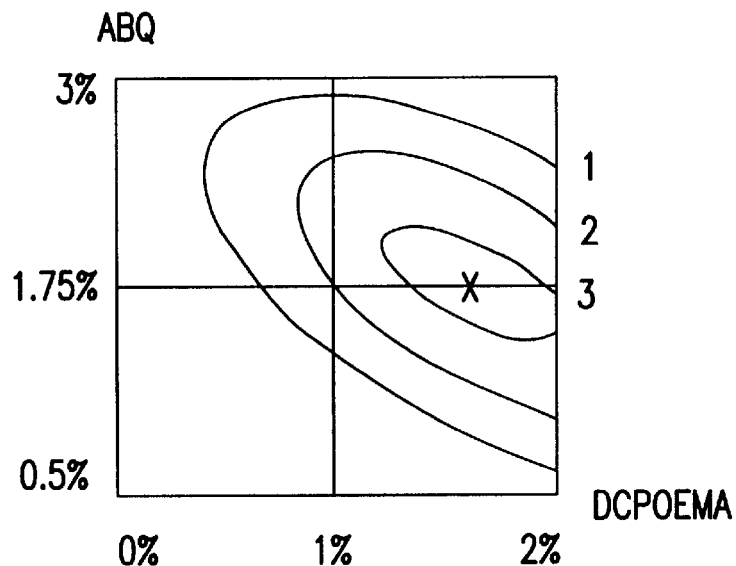
FIGS. 15 to 18 show isoresponse curves of dL after periods of exposure to natural light of formulations with cellulosic or acrylic thickener.
Figure 16:
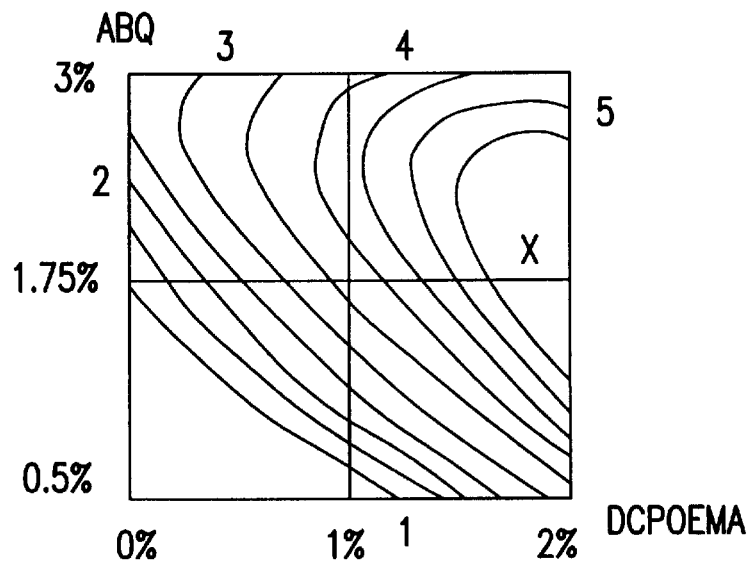
Figure 17:
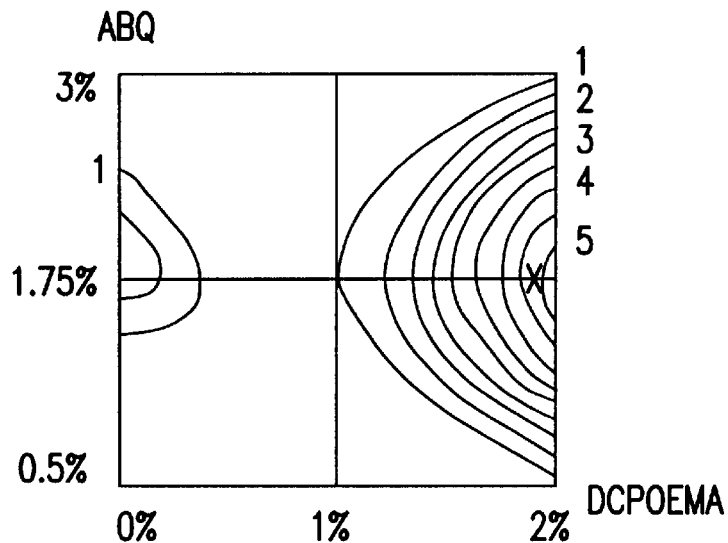
Figure 18:
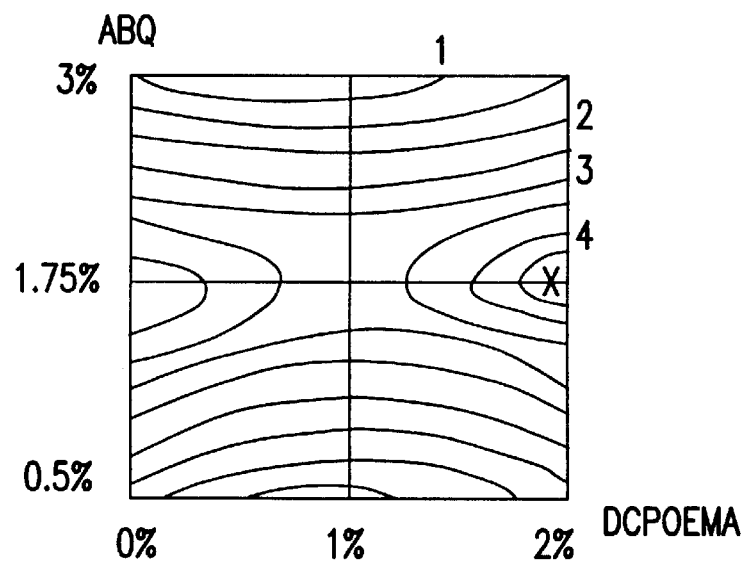

The results are located as indicated on the diagram of experiments of FIG. 14.

After formulation, the paints which have been made photo-crosslinkable at the surface were spread on stainless steel plates in a thickness of 200 μm. The coatings were then subjected to various photochemical tests.

1) QUV cycle (4 hours of UV+4 hours at condensation), or
2) Drying for 6 days (at 23° C. and 50% relative humidity) followed by 3 days of exposure to solar UV, or
3) One exposure of 15 days to solar UV, or
4) 2 months of exposure to sunlight.

For each photosensitive formulation (13 in all), the plates were subjected to one of these four photochemical treatments. The plates were then soiled artificially with the aid of the slurry, and then washed.

The luminance measurements were carried out following application of the paints to stainless steel, following UV exposure and following cleaning of the slurry. The results shown are those obtained from the dL between the value of L after application of the paints and the value of L after cleaning of the slurry. The table below collates the values of the coefficients b, in particular coefficients b1 (effect of the % of DCPOEMA in the latex), b2 (effect of the % of ABQ in the formulation) and b12 (effect of interaction between these two parameters).

| | QUV | | 3 days of sun | | 15 days of sun | | 2 months of sun | |
|---|---|---|---|---|---|---|---|---|
| | cell. | acryl. | cell. | acryl. | cell. | acryl. | cell. | acryl. |
| b0 | −0.5 | −0.5 | −4.7 | −3.7 | −4.7 | −1.8 | −1.0 | −3.7 |
| b1 | | | | | | | | |
| b2 | | | | | | | | |
| b11 | −1.6 | −1.6 | −2.7 | −0.1 | −2.7 | 0.1 | −0.6 | −0.1 |
| b22 | −4.0 | −4.0 | −4.0 | −6.7 | −4.0 | −6.5 | −4.0 | −6.7 |
| | | | | | | | | |

These values make it possible to interpolate the values of dL measured in accordance with the formula $Y=dL=b0+b1.X_1+b2.X_2+b11.X_1^2+b22\ X_2^2+b12.X_1.X_2$ in which $X_1$ and $X_2$ vary from 0 to 1 with the proviso that $X_1+X_2=1$. The value of dL is always negative, since the luminance diminishes once the plates have been soiled by the slurry. The closer the value of dL to 0 (similar luminances before and after soiling), the more effective the formulation against dirtying. The effects of b1 and b2 are positive, and reflect the positive influences of the increasing proportion of photoinitiator ABQ and of the increasing percentage of DCPOEMA in the latex.

The isoresponse curves of dL after periods of exposure to natural light of 3 days and 2 months of the formulations, with cellulosic or acrylic thickener (FIGS. 15 to 18). show the same general characteristics. The ideal formulations are marked thereon with a cross.

a) Formulas Containing Cellulosic Thickener

After 3 days of exposure (FIG. 15), the maximum dL value reached is −4. After 2 months in the sun (FIG. 16), this value climbs to −0.5. A very substantial improvement in performance is therefore noted, in terms of soiling resistance, between these two periods.

b) Formulas Containing Acrylic Thickener

After only 3 days of exposure to solar UV (FIG. 17), a maximum dL value of −0.5 is reached. After 2 months of exposure (FIG. 18), this performance has shown no further substantial change. These results point towards crosslinkable paint compositions with good resistance to dirtying comprising a proportion of photoinitiator ABQ of approximately 1.75% by mass relative to wet latex which itself contains from 1.5 to 2% by mass of DCPOEMA in its organic part, preference being given to a composition containing acrylic thickener.

POSSIBILITIES OF INDUSTRIAL APPLICATION

The invention is applied to the production of photocurable compositions for the preparation, for example, of inks, adhesives, products for the pigmentary printing of textiles or for the finishing of leather, and above all of varnishes and paints.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. A latex composition consisting essentially of (A) water, (B) a photoinitiator in a percentage by weight relative to the wet latex of between 0.01 and 5% and (C) copolymers of α,β-unsaturated compounds and dicyclopentenyloxyethyl methacrylate (DCPOEMA), wherein the latex composition contains DCPOEMA in a percentage by weight relative to the total amount of DCPOEMA copolymers of between 0.01 and 50%, wherein the latex composition is coalesceable by evaporating water therefrom to form a film to be photocrosslinked, and wherein exposure of the coalesed film to ultraviolet radiation photocrosslinks the DCPOEMA copolymers.

2. Composition according to claim 1, wherein the content of DCPOEMA is between 1 and 5%.

3. Compositions according to claim 1, wherein the photoinitiator is a quaternary ammonium derivative of benzophenone or of thioxanthone.

4. Compositions according to claim 3, wherein the photoinitiator is selected from the group consisting of (4-benzoylbenzyl)trimethylammonium chloride, 2-hydroxy-3-(4-benzoylphenoxy)-N,N,N-trimethyl-1-propanaminium chloride monohydrate, 2-hydroxy-3-(3,4-dimethyl-9-oxo-9H-thioxanthen-2-yloxy)-N,N,N-trimethylpropanaminium chloride and (2-acryloyloxyethyl)(4-benzoylbenzyl)dimethylammonium bromide.

5. Compositions according to claim 1 wherein the photoinitiator is a functionalized benzophenone or substituted phenylpropane which is soluble in organic solvents.

6. Compositions according to claim 5, wherein the photoinitiator is 1-(2-ethylhexyloxy)-2-(acetoxy)-3-(2-benzoylbenzoyloxy)propane.

7. Compositions according to claim 5, wherein the photoinitiator is a substituted phenylpropanone.

8. Compositions according to claim 7, wherein the photoinitiator is selected from the group consisting of 2-hydroxy-2-methyl-1-phenylpropan-1-one and 2-methyl-1-[4-(methylthio)phenyl]-2-morpholino-1-propanone.

9. Compositions according to claim 7, wherein the photoinitiator is an oligomer of 2-hydroxy-2-methyl-1-[(4-isopropenyl)phenyl]propan-1-one.

10. A method of photosensitizing a copolymer film comprising the steps of:

copolymerizing α,β-unsaturated monomers and dicyclopentenyloxyethyl methacrylate (DCPOEMA) monomer by emulsion polymerization to form copolymers of α,β-unsaturated compounds and DCPOEMA in a continuous aqueous phase; and adding a photoinitiator operable in ultraviolet radiation to the copolymers of α,β-unsaturated compounds and DCPOEMA in the continuous aqueous phase to form the latex composition;

wherein the DCPOEMA is in a percentage by weight relative to the total amount of DCPOEMA copolymers of between 0.01 and 50%, and the photoinitiator being in a percentage by weight relative to the wet latex of between 0.01 and 5%; and wherein the latex composition is coalesceable by evaporating water therefrom to form a film to be photocrosslinked, and exposure of the coalesed film to ultraviolet radiation photocrosslinks the DCPOEMA copolymers.

11. Compositions according to claim 10 wherein the α,β-unsaturated compound is methylmethacrylate or butylacrylate.

12. Method according to claim 10 wherein a photoinitiator or a solution of a photoinitiator is a quaternary ammonium derivative of benzophenone, or of thioxanthone and is added to the latex.

13. Method according to claim 10, wherein a photoinitiator or a solution of a photoinitiator is selected from the group consisting of (4-benzoylbenzyl)trimethylammonium chloride, 2-hydroxy-3-(4-benzoylphenoxy)-N,N,N-trimethyl-1-propanaminium chloride monohydrate, 2-hydroxy-3-(3,4-dimethyl-9-oxo-9H-thioxanthen-2-yloxy)-N,N,N-trimethyl-propanaminium chloride and (2-acryloyloxyethyl)-(4-benzoylbenzyl)dimethylammonium bromide and is added to the latex.

14. Method according to claim 10 wherein the photoinitiator is a functionalized benzophenone or substituted phenylpropane which is soluble in organic solvents.

15. Method according to claim 14 wherein a photoinitiator or a solution of a photoinitiator is 1-(2-ethylhexyloxy)-2-(acetoxy)-3-(2-benzoylbenzoyloxy)propane and is added to the latex.

16. Method according to claim 14, wherein a photoinitiator or a solution of a photoinitiator is a substituted phenyl-propanone derivative which is soluble in organic solvents and is added to the latex.

17. Method according to claim 16, wherein a photoinitiator or a solution of a photoinitiator is selected from the group consisting of 2-hydroxy-2-methyl-1-phenylpropan-1-one and 2-methyl-1-[4-(methylthio)phenyl]-2-morpholino-1-propanone and is added to the latex.

18. A method of photocrosslinking a copolymer film comprising the steps of:

copolymerizing α,β-unsaturated monomers and dicyclopentenyloxyethyl methacrylate (DCPOEMA) monomer by emulsion polymerization to form copolymers of α,β-unsaturated compounds and DCPOEMA in a continuous aqueous phase;

adding a photoinitiator operable in ultraviolet radiation to the copolymers of α,β-unsaturated compounds and DCPOEMA in the continuous aqueous phase to form the latex composition;

the DCPOEMA being in a percentage by weight relative to the total amount of DCPOEMA copolymers of between 0.01 and 50%, and the photoinitiator being in a percentage by weight relative to the wet latex of between 0.01 and 5%;

covering a substrate with the latex composition to form a latex coating;

coalescing said latex coating by evaporating water therefrom to form a film to be photocrosslinked; and exposing said film to ultraviolet radiation to photocrosslink the DCPOEMA copolymer.

19. The method of claim 18 wherein said latex composition is a paint, a varnish, an ink, an adhesive, a product for the pigmentary printing of textiles or a product for the finishing of leather.

* * * * *